UNITED STATES PATENT OFFICE.

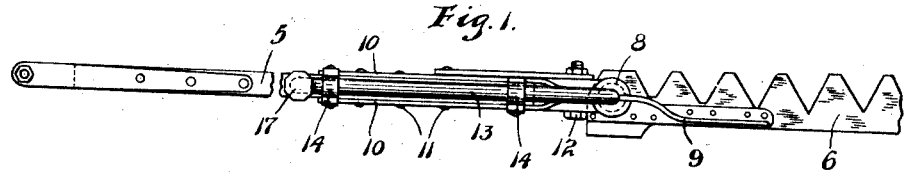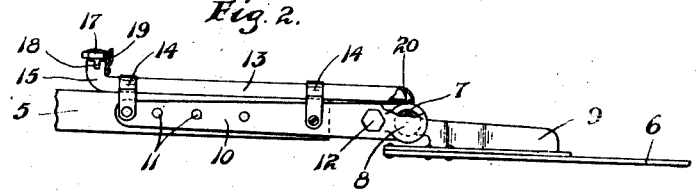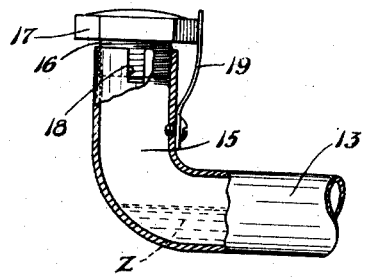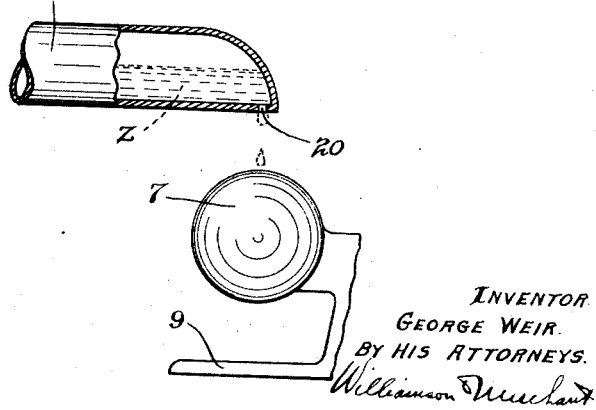
INVENTOR
GEORGE WEIR.
BY HIS ATTORNEYS.

GEORGE WEIR, OF IRON RIVER, WISCONSIN.

AUTOMATIC OILER.

1,365,877.                 Specification of Letters Patent.    Patented Jan. 18, 1921.

Application filed December 27, 1919. Serial No. 347,771.

*To all whom it may concern:*

Be it known that I, GEORGE WEIR, a citizen of the United States, residing at Iron River, in the county of Bayfield and State of Wisconsin, have invented certain new and useful Improvements in Automatic Oilers; and I do hereby declare the following to be a full, clear, and exact description of the invention, such as will enable others skilled in the art to which it appertains to make and use the same.

My invention has for its object to provide an automatic oiler intended for general use, but especially adapted for oiling the pivotal connection between the pitman and cycle bar of a mower, reaper, harvester or the like.

To the above end, generally stated, the invention consists of the novel devices and combinations of devices hereinafter described and defined in the claim.

In the accompanying drawings, which illustrate the invention, like characters indicate like parts throughout the several views.

Referring to the drawings:

Figure 1 is a plan view of the improved oiler applied to the pitman of a mower and positioned to lubricate the ball and socket joint between said pitman and the cycle bar;

Fig. 2 is a view principally in elevation of the parts shown in Fig. 1;

Fig. 3 is a view partly in elevation and partly in longitudinal vertical section of the filling end of the oiler; and Fig. 4 is a view partly in elevation and partly in central vertical section of the delivery end of the oiler and ball member of the ball and socket joint.

The numerals 5 and 6 indicate, respectively, the pitman and cycle bar of a mowing machine, and which pitman and cycle bar are connected by a ball and socket joint, the members of which are indicated by the numerals 7 and 8. The ball member 7 is formed with a bracket 9 rigidly secured to the cycle bar 6, and the socket member 8 is made in two sections which receive opposite sides of the ball member 7. These socket sections are formed with straps 10 which embrace opposite sides of the pitman 5 and are rigidly secured thereto by rivets 11 or other fastening means.

A draw-bolt 12 connects the two socket straps 10 close to the member 8 outward of the pitman 5, and is provided for frictionally and adjustably clamping the socket sections onto the ball 7. The sections of the socket members 8 are laterally spaced to receive loosely therebetween the neck which connects the ball member 7 to the bracket 9, and thereby permit the cycle bar 6 to be raised and lowered.

The parts thus far described may be of standard or any desired construction.

Referring now in detail to the invention, the numeral 13 indicates a horizontally disposed tubular reservoir which rests on top of the pitman 5 and extends longitudinally thereof. A pair of U-shaped clips 14 are provided for securing the oil reservoir 13 to the pitman 5. These clips 14 straddle the reservoir 13 with their ends embracing the socket straps 10 and are secured thereto by certain of the fastening means 11.

The left-hand end of the oil reservoir 13 is turned upward to afford a filling neck 15, which is normally closed by a plug 16 having screw-threaded engagement therewith and provided with a hexagon head 17. An air vent 18 is formed in the neck 15, as shown in the form of a notch in the upper edge of said neck, and arranged to be closed to a greater or less extent by the plug 16. A leaf spring 19 is secured to the neck 15 and bears against the head 17 to frictionally hold the plug 16 where set. The other or right-hand end of the oil reservoir 13 is closed, except for a small oil-escape port 20 formed in the bottom of said reservoir close to the respective end thereof. The delivery end of the reservoir 13 extends outward of the pitman 5 a distance sufficient to position the port 20 over the ball and socket joint 7—8, as best shown in Fig. 4, so that oil forced through said port will drip onto the ball of said joint. The distance which the oil reservoir 13 projects beyond the pitman 5, however, is not so great as to interfere with the raising and lowering of the cycle bar 6.

During the reciprocating movement of the pitman 5, the oil Z, in the reservoir 13, is splashed back and forth and forced through the oil discharge port 20 so as to drip on the ball 7 and lubricate the ball and socket joint. The amount of oil discharged through the port 20 may be varied, at will, by manipulating the plug 16 to vary the size of the air vent 18. When the pitman 5 is not in motion, oil will not be discharged through the port 20.

It is now necessary to oil the ball and socket joints, used on machines herein referred to, very often to eliminate wear and friction, and it is also the custom to leave the socket sections very loose on the ball to prevent the ball and socket joint from becoming hot when the cycle bar 6 is used to cut tough grass or grains.

By the use of my improved oiler, it is not necessary for the operator to stop and oil the ball and socket joint, and the socket sections may be snugly clamped on the ball 7 so as to take up all slack between the pitman and cycle bar and thereby prevent a loose joint between the pitman and cycle bar to eliminate wear, friction and a jerking movement of the cycle bar.

What I claim is:

The combination with the pivotal connection between a pitman and cycle bar, of a horizontally disposed tubular oil reservoir secured to the pitman and having at one end in the bottom thereof an unobstructed oil discharge port through which oil may drip directly on said connection and having at its other end a filling neck having a constantly open air vent located above the oil level in the reservoir, and an adjustable plug normally closing said neck and arranged to vary the size of the air vent.

In testimony whereof I affix my signature in presence of two witnesses.

GEORGE WEIR.

Witnesses:
P. J. SAVAGE,
E. G. HEDQUIST.